UNITED STATES PATENT OFFICE.

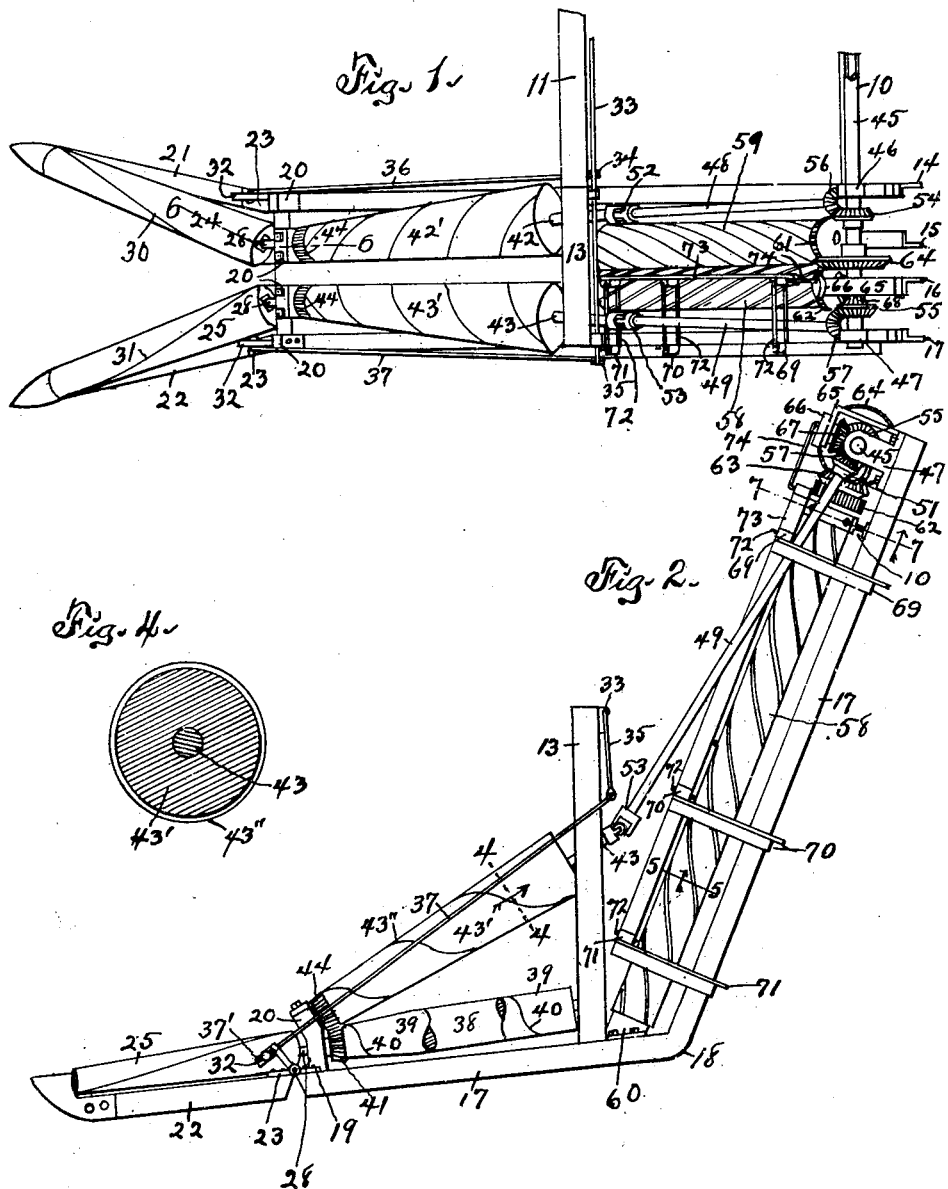

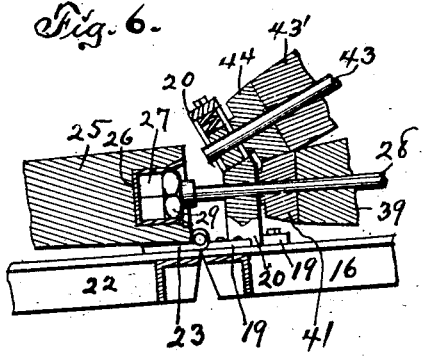
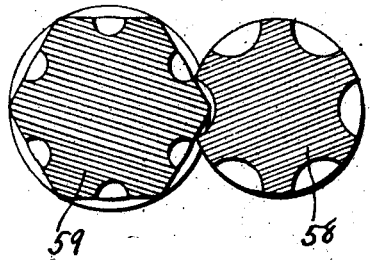
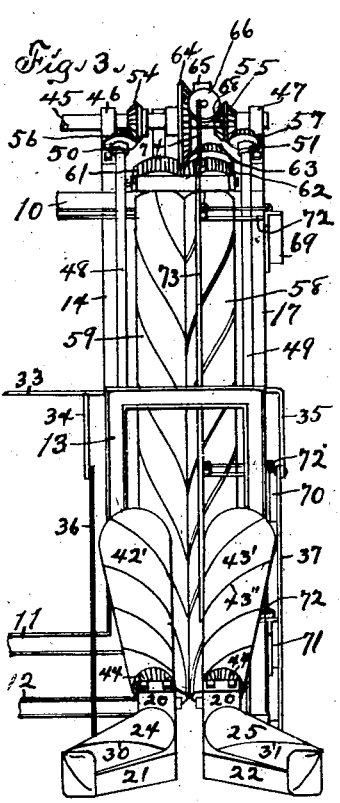
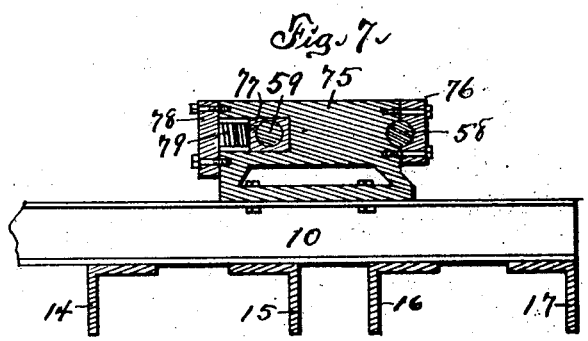
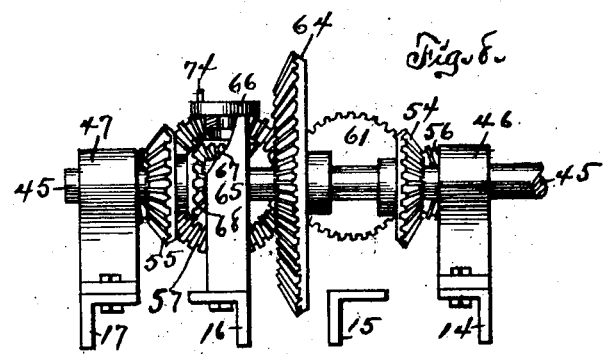

CARL DUEKER, OF COOPER TOWNSHIP, WEBSTER COUNTY, IOWA.

GATHERING MECHANISM FOR CORN-HARVESTING MACHINES.

1,368,028. Specification of Letters Patent. Patented Feb. 8, 1921.

Application filed April 24, 1920. Serial No. 376,232.

*To all whom it may concern:*

Be it known that I, CARL DUEKER, a citizen of the United States of America, and resident of Cooper township, Webster county, Iowa, have invented a new and useful Gathering Mechanism for Corn-Harvesting Machines, of which the following is a specification.

The object of this invention is to provide improved means for gathering corn stalks from natural positions in a field and conveying or guiding them into positions for snapping of ears therefrom.

A further object of this invention is to provide dual means for gathering, guiding and conveying corn stalks without entirely severing said stalks or uprooting them, one means being adapted to straddle, collect and center stalks from various natural positions and guide them to the second means, which second means is adapted to position said stalks more or less upright and guide and deliver them to snapping mechanism whereby ears may be detached from the stalks.

A further object of this invention is to provide improved means for raising and lowering the foremost gathering means.

A further object of this invention is to provide improved means for driving the foremost gathering means from and by a secondary gathering means.

A further object of this invention is to provide improved means for driving the secondary gathering means.

A further object of this invention is to provide a supplementary gathering means auxiliary to the secondary driving means and adapted to be driven thereby.

A further object of this invention is to combine with a dual gathering means a snapping mechanism and means for driving it.

A further object of this invention is to combine a dual gathering means, a supplementary gathering means driven thereby and a snapping mechanism.

My invention consists in the construction, arrangement and combination of elements hereinafter set forth, pointed out in my claims and illustrated by the accompanying drawing, in which—

Figure 1 is a plan illustrating the general arrangement and combination of elements forming, in part, the subject matter of this invention. Fig. 2 is a side elevation of the elements shown in Fig. 1, a portion of one of the rolls being broken away to reveal posterior construction. Fig. 3 is a front elevation of the devices shown in Figs. 1 and 2. Fig. 4 is a cross section, on an enlarged scale, on the indicated line 4—4 of Fig. 2. Fig. 5 is a cross section, on an enlarged scale, on the indicated line 5—5 of Fig. 2. Fig. 6 is a longitudinal section, on an enlarged scale, on the indicated line 6—6 of Fig. 1. Fig. 7 is a cross section, on an enlarged scale, on the indicated line 7—7 of Fig. 2. Fig. 8 is an enlarged detail view illustrating the gear assembly employed to drive the snapping and gathering mechanism.

In the construction of the mechanisms and mounting thereof as shown, the numerals 10, 11 and 12 designate I beams which are adapted to be carried on and project laterally from a vehicle (not shown) and portions only of such beams are here shown in supporting relation to the mechanisms carried thereby. The I-beam 12 is in a lower plane than the I-beam 11 and preferably in the same vertical plane as the beam 11. The beam 11 is formed with an arch 13 of sufficient height to travel over standing cornstalks without breaking them unduly. The beam 10 is at greater altitude than the arch 13 and is adapted to carry certain mechanism in a plane at greater altitude than the standing corn-stalks. Angle bars 14, 15, 16 and 17 are arranged side by side in inclined planes and are fixed near their upper end portions to and extend beneath the I-beam 10. The angle bars 14 and 17 are bent at 18 and extend forwardly from the bend and one is fixed to and supported by the beam 12 and the other is fixed to and supported by the lower end of the outermost leg of the arch 13, and said bars are located on opposite sides of the opening through said arch. The angle bars 14 and 17 extend forwardly from the beam 12 and arch 13 in slightly inclined planes (Fig. 2). The angle bars 15, 16 are spaced from and between the angle bars 14 and 17, are slightly spaced apart for the passage of corn stalks between them, are fixed to and extend beneath the beam 10 and are secured to the beam 12 and arch 13 respectively, and also are fixed to the outside angle bars 14 and 17. The angle bars 14, 15 and 16, 17, considered as pairs, carry hinge members 19, one of which is shown in Fig. 2, each hinge member serving to connect the bars in pairs and also supporting stands or brackets 20, 20 (Fig. 3). Shoes 21, 22 are arranged in front of the forward ends of the pairs of angle bars, are arranged in diverging planes, and are formed with hinge members 23 (one of which is shown in Fig. 2) on their rear ends, which are pivoted to the hinge members 19. It is the function of the shoes 21, 22 to straddle a row of corn stalks and gather between them such stalks from all natural positions in which they may stand or be inclined or fallen. Rollers 24, 25 are arranged above and substantially parallel with the shoes 21, 22, project inwardly beyond the inner margins of the shoes, and are pivoted at their forward ends to upwardly extending forward end portions of said shoes. The rollers 24, 25 are frustoconical in form and have their smaller end portions at the front and the rear end portion of each roller is formed with a cavity 26 lined with an angular slide bearing 27. Shafts 28 are arranged substantially parallel with each other, one of which is shown in Fig. 6, and are journaled at opposite ends in bearings 20 and in other bearings (not shown in detail) of suitable form located at the lower ends of the arch 13 and carried by the angle bars. Forward end portions of the shafts 28 are formed with angular heads 29, one of which is shown in Fig. 6, which are fitted to and slidingly engage in the lining bearings 27. The heads 29 are shaped to permit oscillation of the rollers 24, 25 and bearings 27 thereon on axes transversely of the path of travel of the machine, and are made angular in order that any rotation of said shafts and heads may correspondingly rotate said rollers. The rollers 24, 25 are formed with oppositely arranged spiral fins 30, 31 respectively, which fins are adapted, in the rotation of the rollers, to pick up down corn stalks and tend to hold them in erect positions for engagement by next following devices. The rollers 24, 25 also occupy diverging planes, being spaced apart at their larger inner ends sufficiently to permit the passage between them of corn stalks. The rollers 24, 25 preferably are made of wood and the fins 30, 31 preferably are of thin metal and embedded in spiral grooves in the wooden rollers. Arms 32 are formed on and extend upwardly and forwardly from the hinge members 23. A rock shaft 33 is journaled in suitable bearings on the top of the arch 13 and is formed with crank arms 34, 35 normally depending therefrom. Rods 36, 37 flexibly and pivotally connect the lower ends of the crank arms 34, 35 to the extremities of the arms 32. Slots 37' are provided at the point of connection of the rods 36, 37 and arms 32, whereby the shoes may drop slightly to follow depressions in the ground surface, to pick up down corn. A suitable operating device, adapted for manual actuation, may be mounted on the vehicle and connected with the rock shaft 33 for operation of said rock shaft or for holding the same in any position in which it may be placed manually. It is the function of the rock-shaft 33 and its connections to adjust the shoes and gathering rollers carried thereby relative to a horizontal plane. Supplementary gathering rollers 38, 39 are mounted on and rotated by the shafts 28 at the rear of the rollers 24, 25 and adjacent to, above and overlapping inwardly from the angle bars 15, 16. The supplementary rollers 38, 39 preferably are made of wood and one is provided with a spiral fin 40 adapted to engage corn stalks, which fin is of lower pitch than the fins 30, 31 and tends to feed the corn stalks relative to the machine at slower speed. Each of the supplementary rollers 38, 39 is provided with a beveled gear 41 at its forward end and fixed to the shaft 28. Suitable bearings, not shown, are mounted in the arch 13 and shafts 42, 43 carrying secondary gathering rollers 42', 43' are mounted in substantially parallel planes and are journaled at their upper ends in said bearings, the lower end portions of said shafts being journaled in the bearings 20 and provided with bevel-gears 44 meshing with the bevel-gears 41. Thus provision is made for driving the shafts 28, the supplementary gathering rollers 38, 39 thereon and the first gathering rollers 24, 25 connected therewith. A shaft 45 is arranged above and substantially parallel with the I-beam 10, is mounted for rotation in suitable bearings 46, 47 carried by the angle bars 14 and 17 and is adapted to be driven by mechanism on or associated with the land vehicle. Tumbling rods 48, 49 are journaled at their upper ends in bearings 50, 51 carried by the bearings 46, 47 and are connected by suitable couplings 52, 53, or universal joints, to the upper ends of the shafts 42, 43. Bevel-gears 54, 55 on the shaft 45 mesh with bevel-gears 56, 57 on the upper ends of the tumbling rods 48, 49 and drive said rods in opposite directions. Snapping rollers 58, 59 are mounted in steep vertical planes at the rear of the arch 13 and are journaled at their lower ends in suitable bearings 60 carried by the angle bars 14, 15, 16 and 17, which bearings connect said angle bars in pairs immediately at the rear of the arch. The snapping rollers 58, 59 are provided with inter-meshing spur gears 61, 62 at their upper ends and a bevel-gear 63 is mounted on the roller 58 contiguous to the spur gear 62 and meshes with and is driven by a bevel-gear 64 on the shaft 45. A yoke 65 is mounted on the angle-bar 16 and a stub shaft is journaled in the central portion of said yoke and carries a wrist wheel 66, on one end and a bevel-gear 67 on the opposite end, which bevel-gear meshes with and is driven by a bevel-gear 68 on the shaft 45. Angle bars 69, 70 and 71 are mounted on and extend forwardly and upwardly from the angle far 17 and extend across at one side of the snapping roller 58. Looped arms 72, one for each angle bar 69, 70, 71, are pivoted at one end each to said angle bars and extend laterally partly across and in front of the snapping roller 58. An agitator or baffle 73 is pivoted to and carried by inner ends of the looped arms 72 and occupies a position parallel with, slightly spaced from and in front of the snapping roller 58 between the line of demarcation between the snapping rollers and the center of said roller 58. A pitman 74 is pivoted at one end to the upper end of the agitator or baffle 73 and is pivoted at its other end in decentered relation, to the wrist wheel 66. Thus is provision made for transforming rotary motion of the wrist wheel 66 into reciprocatory motion of the agitator or baffle 73. A bearing-block 75 (Fig. 7) is mounted on the beam 10 and the upper end portion of the snapping roller 58 is journaled in the bearing formed by one end of said block and a cap 76 secured thereto, while the adjacent end of the snapping roller 59 is journaled in a bearing 77 mounted in a slide seat in said block and confined by a cap 78 mounted on said block opposite to the cap 76, a compression spring 79 being interposed between the cap 78 and the bearing 77. A similar cushioned bearing is provided in connection with one of the bearings 60 to accommodate the lower end of the roller 58 and similar cushioned bearing are provided in the bearings 20 to accommodate the shafts 42, 43. Thus is provision made for yieldingly mounting one or another of the operating rollers to compensate for an over-load occasioned by passage between them of corn stalks or other objects of unusually large size.

In practical use the shaft 45 serves as a driver and acting through the shafts and rollers as above described rotates the forward gathering rollers 24, 25 oppositely and evolutely in such manner as to cause them and the fins thereon to pick up down stalks and guide them between the secondary gathering rollers operating involutely and the supplementary gathering rollers, which in turn and conjunctively support and drive all of the corn stalks into the zone of operation of the snapping rollers. It is the function of the snapping rollers to snap the ears from the stalks and the gear ratio employed is such that all of the stalks and forage thereon is left in the best possible condition after it has passed between the rollers. It is the function of the agitator or baffle 73 to prevent ears of corn, alone or contained in their husks, being carried over the snapping roller 58. Suitable receiving means may be employed at the foot of the snapping rollers for the ear-corn snapped from the stalks thereby and suitable elevating, conveying, husking and driving mechanism may be supplied, the same forming no part of my present invention and, consequently, not being shown.

I claim as my invention—

1. A gathering mechanism for corn harvesting machines, comprising a suitable frame, shoes hinged to and extending in diverging planes from said frame, gathering rollers journaled on said shoes and means for driving said rollers oppositely.

2. A gathering mechanism for corn harvesters, comprising a suitable frame, shoes hinged to and extending in diverging planes from said frame, means for adjusting said shoes relative to a horizontal plane, rollers journaled on said shoes and means for driving said rollers oppositely.

3. A gathering mechanism for corn harvesters, comprising twin frames spaced apart, shoes hinged to and extending in diverging planes from said twin frames, means for adjusting said shoes relative to a horizontal plane, rollers journaled on said shoes, and means for driving said rollers oppositely.

4. A gathering mechanism for corn harvesters, comprising a suitable frame, secondary gathering rollers journaled in inclined planes in said frame and spaced apart and means for driving said secondary rollers oppositely.

5. A gathering mechanism for corn harvesters comprising a suitable frame, shoes pivoted to said frame, primary gathering rollers journaled on said shoes, secondary gathering rollers journaled on said frame and driving connections between the secondary and primary gathering rollers.

6. A gathering mechanism for corn harvesters, comprising a suitable frame, secondary gathering rollers mounted side by side, spaced apart and in inclined positions in said frame, means for driving said secondary gathering rollers, supplementary gathering rollers journaled in said frame beneath said secondary gathering rollers, and means for driving said supplementary gathering rollers.

7. A gathering mechanism for corn harvesters comprising a suitable frame, shoes hinged to said frame, gathering rollers journaled on said shoes, secondary gathering rollers journaled on said frame, supplementary gathering rollers journaled on said frame beneath the secondary gathering rollers, driving connections between the primary and supplementary gathering rollers, driving connections between the secondary and supplementary gathering rollers, and means for driving the secondary gathering rollers.

8. A gathering mechanism for corn harvesters comprising a suitable frame, shoes hinged to said frame, gathering rollers journaled on said shoes, secondary gathering rollers journaled on said frame, supplementary gathering rollers journaled on said frame beneath the secondary gathering rollers, driving connections between the primary and supplementary gathering rollers, driving connections between the secondary and supplementary gathering rollers, means for driving the secondary gathering rollers, together with means for oscillating said shoes.

9. A gathering mechanism for corn harvesters, comprising gathering means arranged in diverging planes, secondary gathering rollers arranged substantially parallel and spaced apart and communicating with the first gathering rollers, driving connections between said rollers, tumbling rods acting on the secondary rollers, a drive shaft, and gearing connecting said drive shaft and tumbling rods, whereby said tumbling rods are oppositely rotated.

10. A gathering mechanism for corn harvesters comprising diverging oppositely driven gathering rollers arranged for vertical oscillation, secondary spaced gathering rollers arranged for rotation, spaced supplementary gathering rollers beneath the secondary rollers and arranged for rotation, driving connections between the supplementary rollers and the primary rollers, driving connections between the secondary rollers and supplementary rollers, tumbling rods acting on the secondary rollers, a drive shaft, and gears connecting said drive shaft and tumbling rods, whereby said tumbling rods and devices connected therewith are oppositely driven.

Signed at Fort Dodge, in the county of Webster and State of Iowa, this 6 day of April, 1920.

CARL DUEKER